(12) United States Patent
Miyakawa et al.

(10) Patent No.: US 11,395,990 B2
(45) Date of Patent: Jul. 26, 2022

(54) REVERSE OSMOSIS TREATMENT SYSTEM FOR RECOVERING ENERGY GENERATED BOTH AT BRINE AND PERMEATE SIDES DURING SEA WATER DESALINATION

(71) Applicant: HITACHI, LTD., Tokyo (JP)

(72) Inventors: Hiroki Miyakawa, Tokyo (JP); Kotaro Kitamura, Tokyo (JP); Masayuki Matsuura, Tokyo (JP); Takanori Oshikiri, Tokyo (JP); Yusuke Okawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 362 days.

(21) Appl. No.: 16/424,121

(22) Filed: May 28, 2019

(65) Prior Publication Data

US 2019/0336914 A1 Nov. 7, 2019

Related U.S. Application Data

(62) Division of application No. 15/385,044, filed on Dec. 20, 2016, now Pat. No. 10,427,101.

(30) Foreign Application Priority Data

Dec. 21, 2015 (JP) .................................. 2015-248116

(51) Int. Cl.
 *B01D 61/08* (2006.01)
 *B01D 61/12* (2006.01)
 (Continued)

(52) U.S. Cl.
 CPC ............. *B01D 61/08* (2013.01); *B01D 61/12* (2013.01); *B01D 63/12* (2013.01); *C02F 1/441* (2013.01);
 (Continued)

(58) Field of Classification Search
 USPC ...................................................... 210/660
 See application file for complete search history.

(56) References Cited

U.S. PATENT DOCUMENTS 6,187,200 B1   2/2001 Yamamura et al.
2013/0140233 A1*  6/2013 Taniguchi ............. B01D 61/58
                                                 210/637
2014/0360941 A1  12/2014 Kitamura et al.

FOREIGN PATENT DOCUMENTS

GB      2363741 A     1/2002
JP   2000-093751 A    4/2000
(Continued)

OTHER PUBLICATIONS

Jun. 11, 2019 Office Action issued in Japanese Patent Application No. 2015-248116.
(Continued)

*Primary Examiner* — Hayden Brewster
(74) *Attorney, Agent, or Firm* — Oliff PLC

(57) ABSTRACT

Provided is a reverse osmosis treatment system capable of simultaneously and efficiently recovering energy generated both at brine and permeate sides. The system comprises a branched portion configured to divide second to-be-treated water into third and fourth to-be-treated water; a high-pressure pump configured to pressurize the third to-be-treated water thereby to feed fifth to-be-treated water having a higher pressure than the to-be-treated water before divided; a displacement type of first energy recovery device configured to exchange pressures between the fourth to-be-treated water and brine thus separated by a reverse osmosis treatment device, thereby to produce sixth to-be-treated water having a higher pressure than the fourth one; and a second energy recovery device configured to raise a pressure of the third to-be-treated water located at a downstream side of the branched portion with a pressure of first permeate thus separated by the reverse osmosis treatment device.

2 Claims, 10 Drawing Sheets

(51) Int. Cl.
  *F04B 23/04*   (2006.01)
  *F04F 1/18*    (2006.01)
  *B01D 63/12*   (2006.01)
  *F01L 5/02*    (2006.01)
  *C02F 1/44*    (2006.01)
  *F01D 5/02*    (2006.01)
  *F03B 1/02*    (2006.01)
  *C02F 103/08*  (2006.01)

(52) U.S. Cl.
  CPC ............... *F01D 5/02* (2013.01); *F01L 5/02* (2013.01); *F03B 1/02* (2013.01); *F04B 23/04* (2013.01); *F04F 1/18* (2013.01); *B01D 2311/14* (2013.01); *B01D 2313/246* (2013.01); *B01D 2317/022* (2013.01); *C02F 2103/08* (2013.01); *C02F 2209/03* (2013.01); *C02F 2303/10* (2013.01)

(56) References Cited

FOREIGN PATENT DOCUMENTS

| | | | |
|---|---|---|---|
| JP | 2013-126636 A | | 6/2013 |
| JP | 2013202456 A | * | 10/2013 |
| JP | 2014-136186 A | | 7/2014 |
| JP | 2014-184438 A | | 10/2014 |
| WO | 2015/141693 A1 | | 9/2015 |

OTHER PUBLICATIONS

May 2, 2018 Office Action issued in U.S. Appl. No. 15/385,044.
Oct. 5, 2018 Office Action issued in U.S. Appl. No. 15/385,044.
Kotaro Kitamura et al, "Low Fouling and Energy Save Seawater Reverse Osmosis Desalination System for High Recovery Rate" The International Desalination Association World Congress on Desalination and Water Reuse 2015, Ref: IDAWC15-51577 (Manuscript of Abstract).
Kotaro Kitamura et al, "Low Fouling and Energy Save Seawater Reverse Osmosis Desalination System for High Recovery Rate" The International Desalination Association World Congress on Desalination and Water Reuse 2015, Ref: IDAWC15-51577, (Manuscript of Poster Presentation).
Kotaro Kitamura et al, "New Concept of SWRO* System for High Recovery rate". Singapore International Water Week 2014, The Global Platform to Share and Co-create Innovative Water Solutions, (Manuscript of Poster Presentation).
Kotaro Kitamura et al, "New Concept of SWRO* System for High Recovery rate". Singapore International Water Week 2014, The Global Platform to Share and Co-create Innovative Water Solutions, (Manuscript of Abstract).

* cited by examiner ing a reverse osmosis treatment system in Example 1 of the present invention.

REVERSE OSMOSIS TREATMENT SYSTEM FOR RECOVERING ENERGY GENERATED BOTH AT BRINE AND PERMEATE SIDES DURING SEA WATER DESALINATION

BACKGROUND OF THE INVENTION

1. Field of the Invention

The present invention relates to a reverse osmosis treatment system.

2. Related Art

In s seawater desalination system, demands for energy saving of the system are more growing. As a system for meeting the demands for the energy saving, systems using a reverse osmosis membrane (i.e., RO Membrane) are known, as disclosed in the Japanese Unexamined Patent Application Publications Nos. 2014-184438 and 2013-126636. In those systems, a large volume of RO permeate is obtained from a small volume of to-be-treated water.

Further, the Japanese Unexamined Patent Application Publications No. 2014-136186 discloses an energy recovery device which recovers pressure energy from brine discharged from a reverse osmosis separation device and converts the pressure energy to energy for desalinating seawater.

Conventionally, the reverse osmosis treatment system using a reverse osmosis membrane such as the above mentioned seawater desalination system discharges permeate still having much energy. Hereby, for achieving the energy saving, it is needed to simultaneously recover energy generated at a brine side as well as at a permeate side, produced after being separated from to-be-treated water through a reversed osmosis membrane.

However, there has been no proposal how to specifically configure a system that can simultaneously and efficiently recover energy generated both at brine and permeate sides.

In view of the above circumstance, the present invention is directed to a reverse osmosis treatment system capable of simultaneously and efficiently recovering energy generated both at brine and permeate sides.

SUMMARY OF THE INVENTION

For solving the above drawback, in an aspect of the present invention, a reverse osmosis treatment system includes a reverse osmosis treatment device configured to separate first to-be-treated water into permeate and brine via reverse osmosis; a branched portion configured to divide second to-be-treated water into third to-be-treated water and fourth to-be-treated water; a first pump configured to pressurize the third to-be-treated water thus divided at the branched portion to feed fifth to-be-treated water having a higher pressure than water before divided at the branched portion.

The reverse osmosis treatment system further includes a displacement type of first energy recovery device configured to exchange pressures between the fourth to-be-treated water thus divided and the brine thus separated by the reverse osmosis treatment device thereby to produce sixth to-be-treated water having a higher pressure than the fourth to-be-treated water; a merging portion configured to merge the fifth and the sixth to-be-treated water thereby to produce the first to-be-treated water; and a pressure raising device configured to raise a pressure of to-be-treated water located at a downstream side of the branched portion with a pressure of the permeate thus separated by the reverse osmosis treatment device.

In an another aspect of the present invention, a reverse osmosis treatment system includes a reverse osmosis treatment device configured to separate first to-be-treated water into permeate and brine via reverse osmosis; a first pump configured to pressurize a part of second to-be-treated water to feed third to-be-treated water; a second pump configured to pressurize a remaining part of the second water to feed fourth to-be-treated water; a third pump configured to pressurize the third to-be-treated water to feed fifth to-be-treated water having a higher pressure than the third to-be-treated water.

The reverse osmosis treatment system further includes a first energy recovery device configured to exchange pressures between the fourth to-be-treated water the brine thus separated by the reverse osmosis treatment device thereby to produce sixth to-be-treated water having a higher pressure than the fourth to-be-treated water; a merging portion configured to merge the fifth and the sixth to-be-treated water thereby to produce the first to-be-treated water, and a second energy recovery device configured to raise a pressure of the third to-be-treated water by rotating a turbine or a Pelton wheel with a pressure of the permeate thus separated by the reverse osmosis treatment device.

According to the present invention, provided is a reverse osmosis treatment system capable of simultaneously and efficiently recovering energy generated both at brine and permeate sides.

Hereinafter, the following exemplary embodiments will reveal objects, configurations and effects of the present invention other than the above mentioned ones.

DETAILED DESCRIPTION OF THE PRESENT INVENTION

Hereinafter, Examples of the present invention will be described in detail referring to the attached drawings. Note, in the following descriptions of the respective Examples, to-be-treated water is seawater, and the to-be-treated water is separated into permeate produced by desalting the to-be-treated water and brine having a higher salt concentration than said to-be-treated water.

Example 1

Figure 1:
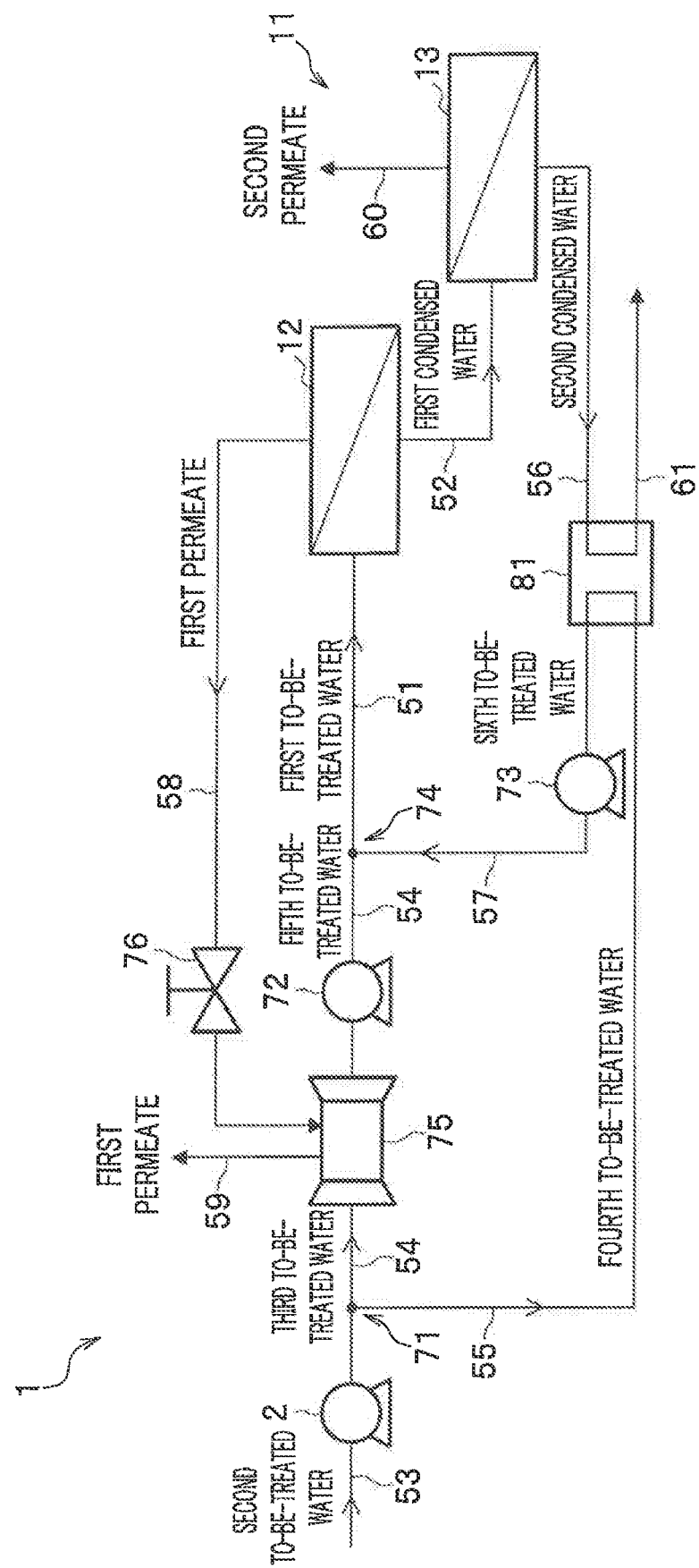
FIG. 1 is an explanatory diagram showing an overall configuration of a reverse osmosis treatment system in Example 1 of the present invention.

FIG. 1 is an explanatory diagram showing an overall configuration of a reverse osmosis treatment system 1 in Example 1 of the present invention. A reverse osmosis treatment device 11 is configured to separate first to-be-treated water thus fed through a flow passage (pipe) 51 into permeate (i.e., first permeate and second permeate) and brine (i.e., second brine) via reverse osmosis. The reverse osmosis treatment device 11 is provided with a first module 12 configured to separate the first to-be-treated water into permeate (i.e., first permeate) and brine (i.e., first brine) via reverse osmosis.

Further, at a downstream side of the first module 12, a second module 12 is provided, which is configured to separate the first brine into the second permeate and the second brine. Herein, the second module 13 is connected to the first module 12 through a flow passage 52. The detailed structure of the reverse osmosis treatment device 11 will be described hereinafter.

First, second to-be-treated water which is seawater untreated in the reverse osmosis treatment system 1 is fed by a water feeding pump 2 into the reverse osmosis treatment system 1 through a flow passage 53. The flow passage 53 is branched to a flow passage 54 and a flow passage 55 at a branched portion 71. Accordingly, the second to-be-treated water is divided into third to-be-treated water and fourth to-be-treated water at the branched portion 71.

A high-pressure pump 72 (i.e., first pump) is disposed in the flow passage 54. The high-pressure pump 72 is configured to pressurize the third to-be-treated water thus divided at the branched portion 71, thereby to feed the fifth to-be-treated water having a higher pressure than the to-be-treated water before divided into the third to-be-treated water.

Here, it should be noted that in Example 1 all of the permeate and to-be-treated water both thus separated by the reverse osmosis treatment device 11 have high pressures. Therefore, a first energy recovery device 81 and a second energy recovery device 75 are provided for recovering the pressure energy thereof so as to be used in processes of the reverse osmosis treatment device 11.

Meanwhile, there has been no proposal how to specifically configure a system including such a first energy recovery device 81 and a second energy recovery device 75 so that said system becomes capable of simultaneously and efficiently recovering energy generated both at brine and permeate sides.

Hereinafter, in view of the above issue, configurations and effects of the reverse osmosis treatment system 1 will be described in detail, referring to a system configuration capable of simultaneously and efficiently recover energy at both brine and permeate sides thereby to realize the energy saving.

First, the first energy recovery device 81 is a displacement type of energy recovery device, configured to exchange a pressure of fourth to-be-treated water thus divided at a branched portion 71 with a pressure of brine (i.e., second brine) thus discharged through a flow passage 56 after separated by a reverse osmosis treatment device 11. Hereby, the first energy recovery device 81 produces sixth to-be-treated water having a higher pressure than the fourth to-be-treated water. The treated second brine thus having a lower pressure via the pressure exchange is discharged into a flow passage 61. Note, the first energy recovery device 81 will be described in detail hereinafter.

A pressure of the sixth to-be-treated water is raised by a pressure raising pump (i.e., second pump) 73 disposed in the flow passage 57.

Ends of the flow passages 54 and 57 are merged at a merging portion 74. An end of the merging portion 74 is connected to the flow passage 51. This configuration allows the fifth to-be-treated water of which pressure is raised by the high-pressure pump 72 and the sixth to-be-treated water of which pressure is raised by the pressure raising pump 73 to be merged at the merging portion 74, thereby producing the first to-be-treated water. Then, the resulting first to-be-treated water is fed to the reverse osmosis treatment device 11.

A pressure raising device (i.e., second energy recovery device) 75 raises a pressure of to-be-treated water at a downstream side of the branched portion 71 (i.e., third to-be-treated water) with a pressure of the permeate (i.e. first permeate) thus separated by the reverse osmosis treatment device 11. More specifically, the second energy recovery device 75 is configured to raise a pressure of the third to-be-treated water in the state prior to being fed by the high-pressure pump 72 and after being divided at the branched portion 71.

Accordingly, the first permeate discharged from the reverse osmosis treatment device 11 flows through the flow passage 58 into the second energy recovery device 75, and a pressure of the first permeate is used for raising a pressure of the third to-be-treated water. Hereby, the pressure of the first permeate becomes lower, and the resulting first permeate is discharged through the flow passage 59 from the second energy recovery device 75. In the flow passage 58, a flow rate adjustment valve 76 is disposed to adjust a flow rate of the first permeate fed to the second energy recovery device 75. The second energy recovery device 75 is arranged between the branched portion 71 and the high-pressure pump 72 in the flow passage 54.

The second energy recovery device 75 raises a pressure of the to-be-treated water located at a downstream of the branched portion 71 (i.e., third to-be-treated water) by rotating a turbine or a Pelton wheel with a pressure of the permeate (i.e., first permeate). That is, the second energy recovery device 75 is a turbocharger type of energy recovery device, and configured to convert the pressure of the first permeate to rotation power of a turbine etc., and use the rotation energy to raise a pressure of the third to-be-treated water to which the energy exchange is performed.

The first permeate discharged from the second energy recovery device 75 and the second permeate discharged from the second module 13 are respectively conveyed through the flow passages 59 and 60 to be used as desalinated water of seawater.

Figure 2:
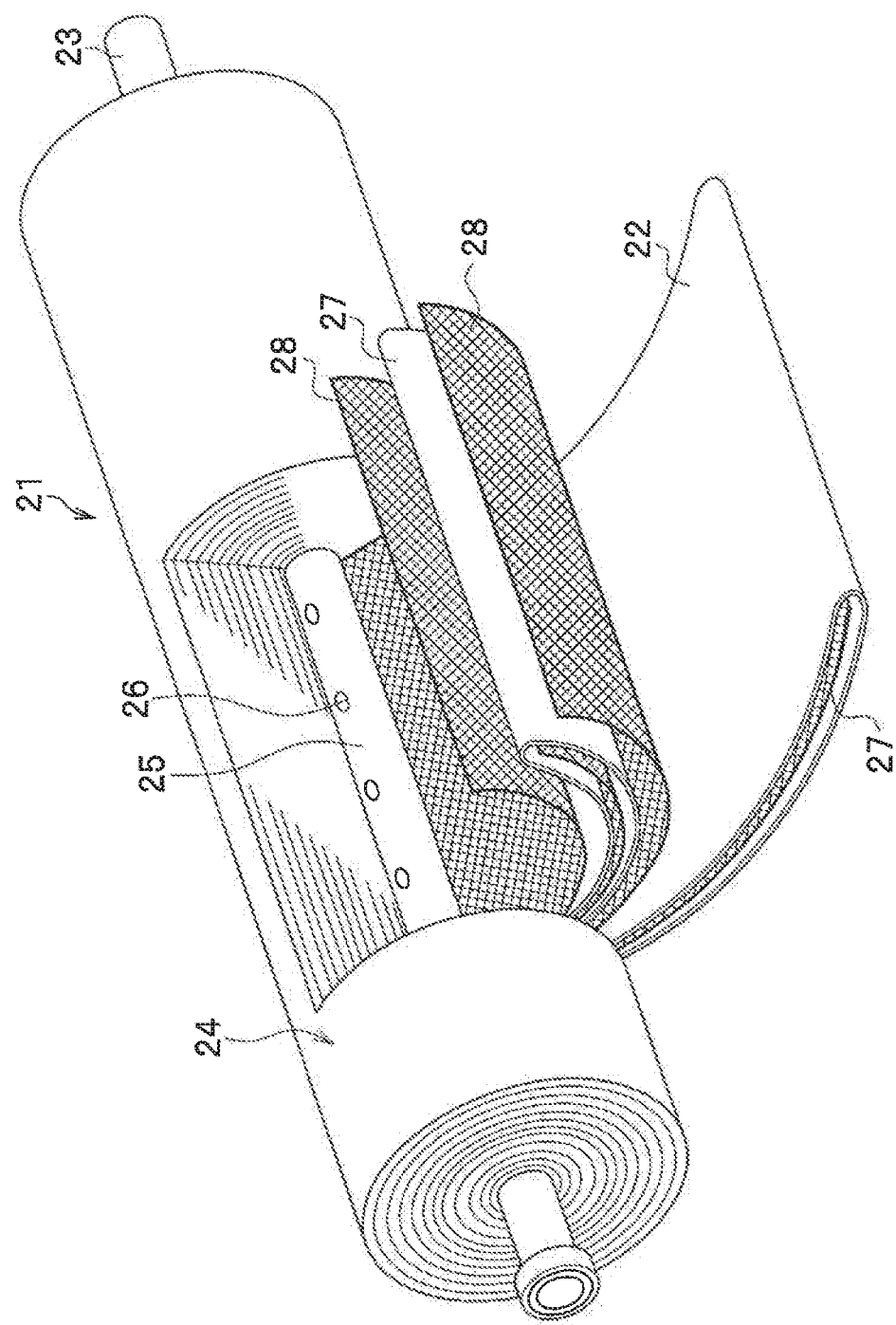
FIG. 2 is a perspective diagram showing a configuration of an element of a reverse osmosis treatment device included in the reverse osmosis treatment system in Example 1 of the present invention.

Next, the reverse osmosis treatment device 11 will be described in detail. FIG. 2 is a perspective diagram showing a configuration of an element 21 of the reverse osmosis treatment device 11. The element 21 is configured by arranging a membrane unit 24 including a reverse osmosis membranes (i.e., RO membranes) 22 and a discharge pipe 23 around a water collecting pipe 25.

Figure 3:
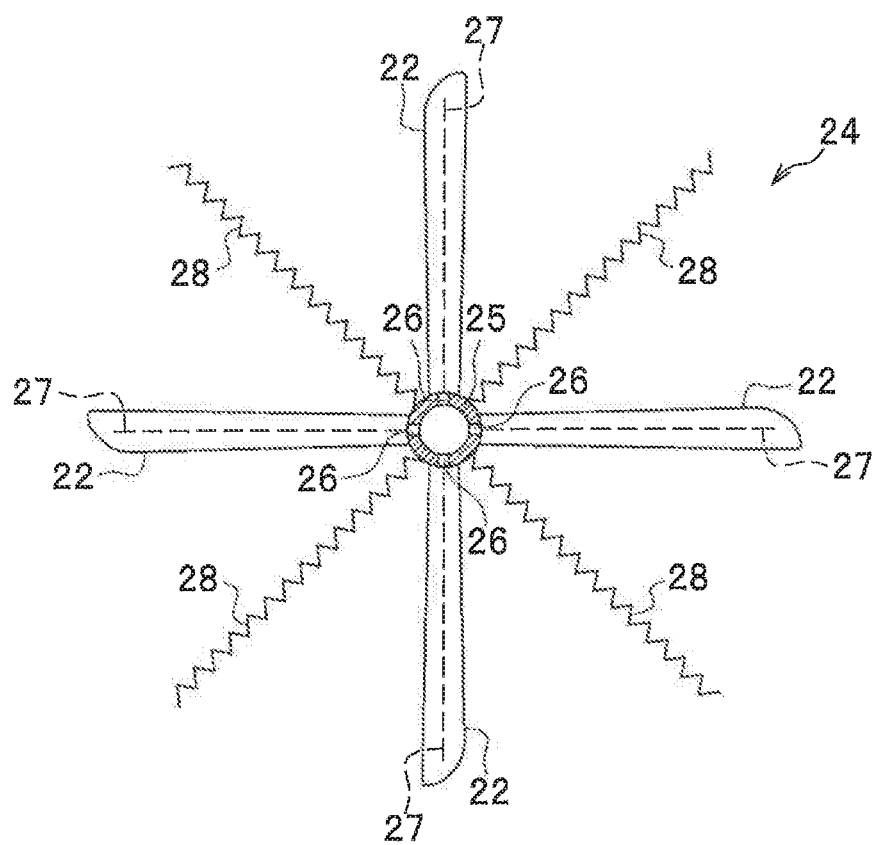
FIG. 3 is a plan view showing an element before winding reverse osmosis membranes of the reverse osmosis treatment system in Example 1 of the present invention.
Figure 4:
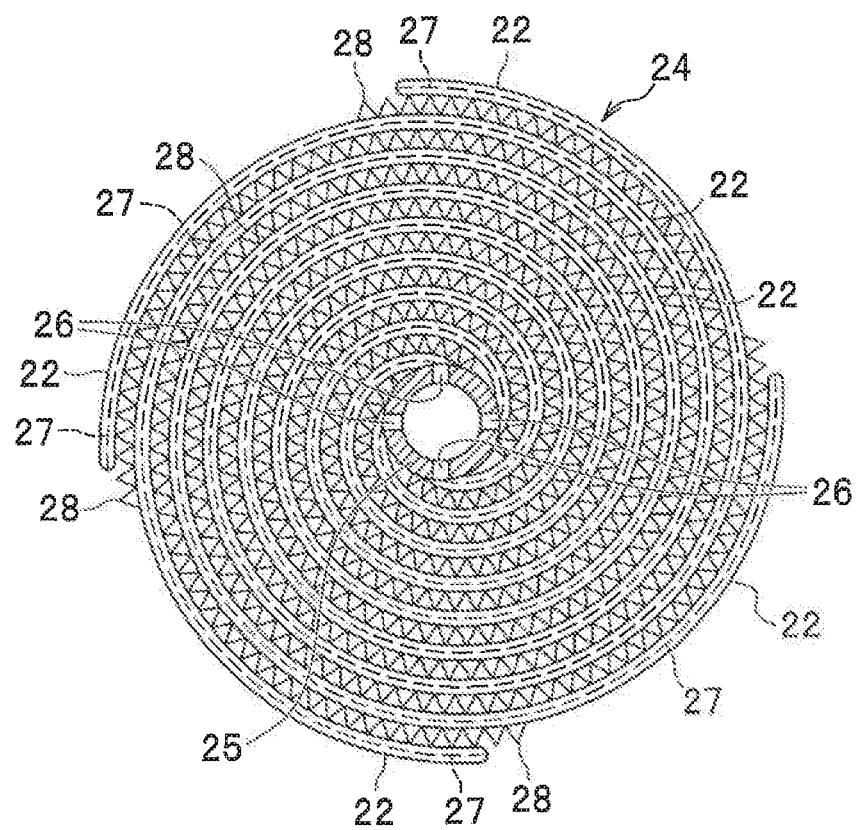
FIG. 4 is a plan view of the element in FIG. 2 of the reverse osmosis treatment system in Example 1 of the present invention.

FIG. 3 is a plan view showing the element 21 under a condition before reverse osmosis membranes 22 of the element 21 are wound. FIG. 4 is a plan view of the element 21 shown in FIG. 2. As shown in FIG. 3, the membrane unit 24 is configured so that four bag-shaped reverse osmosis membranes 22 are radially connected to a circumference of the water collecting pipe 25, and those reverse osmosis membranes 22 are spirally wound around the water collecting pipe 25 as shown in FIG. 4. An end of the bag-shaped reverse osmosis membrane 22 has an opening. The reverse osmosis membrane 22 is adhered to the water collecting pipe 25 so that the opening is communicated to a through hole 26 of the water collecting pipe 25 in FIG. 3.

The first to-be-treated water (or first brine) flows on an outer surface of the reverse osmosis membrane 22, and is desalinated by permeating through the reverse osmosis membrane 22. Then, desalinated first permeate (or second permeate) generated after permeation of the first to-be-treated water through the reverse osmosis membrane 22 is collected in the water collecting pipe 25 from the inside of the reverse osmosis membrane 22 via the opening thereof and the through hole 26. After that, the first permeate is discharged from the element 21 from the water collecting pipe 25 via a discharge pipe 23 (see FIG. 2).

Note, the reference number 27 in FIG. 3 represents a mesh-like spacer arranged inside the reverse osmosis membrane 22. The spacer 27 keeps an interior space of the reverse osmosis membrane 22 by preventing the interior space from collapsing even when the reverse osmosis membrane is spirally wound. Further, the reference number 28 represents a mesh-like spacer arranged between the reverse osmosis membranes 22 located adjacently each other. The spacer 28 is also radially adhered to the circumference of the water collecting pipe 25 the same as the reverse osmosis membrane 22.

Figure 5:
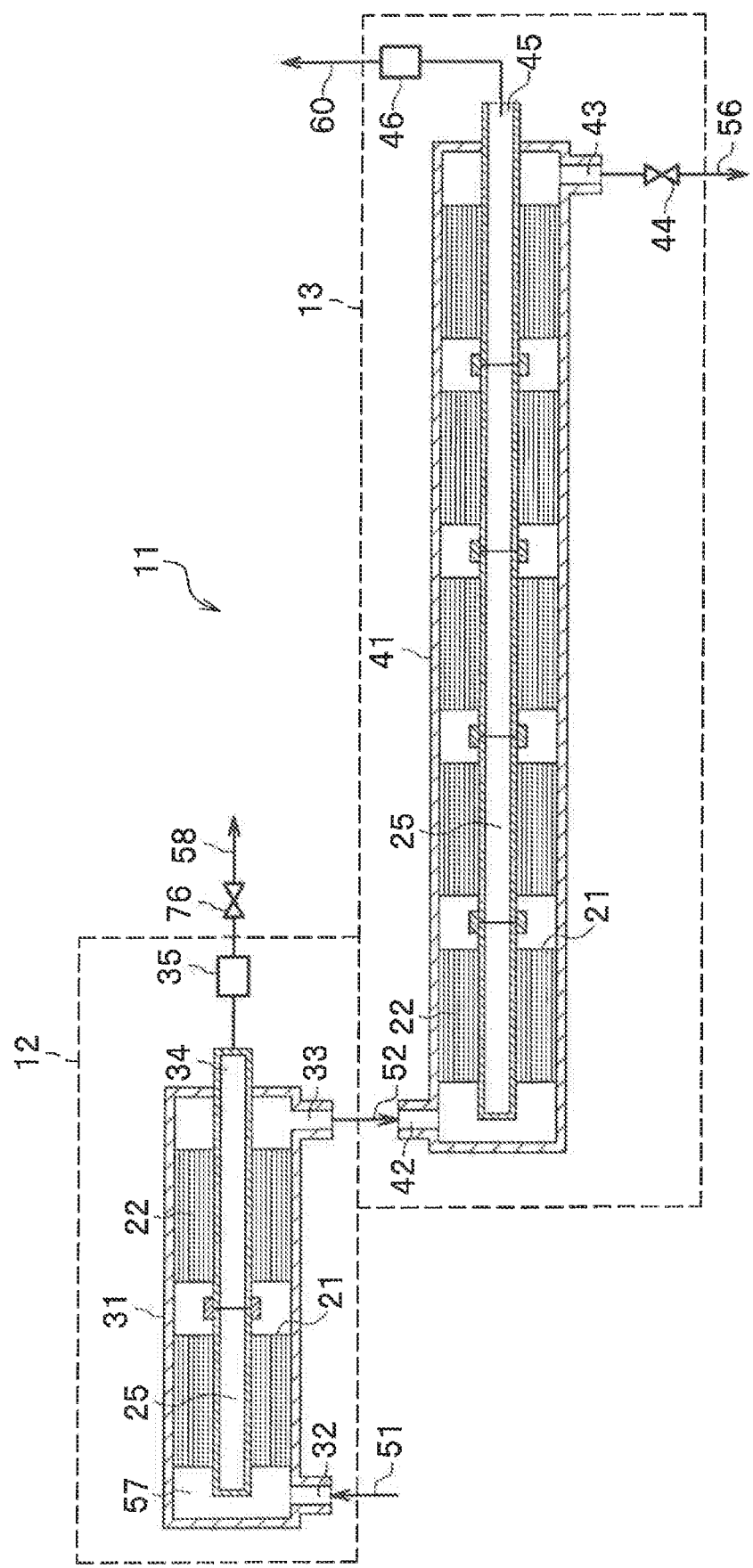
FIG. 5 is a longitudinal cross-sectional diagram showing an overall configuration of the reverse osmosis treatment system in Example 1 of the present invention.

FIG. 5 is a longitudinal cross-sectional diagram of the reverse osmosis treatment device 11. In Example 1, a first vessel 31 included in the first module 12 is configured to connect, for example, two elements 21 in series to perform primary treatment. Further, a second vessel 41 included in the second module 13 is configured to connect, for example, five elements 21 in series to perform secondary treatment. The first to-be-treated water is introduced into an end of the first vessel 31. The end of the first vessel 31 has an opening so that the first brine left after treated by the first vessel 31 (i.e., to-be-treated water that is subjected to the primary treatment) is discharged.

Further, the first brine discharged from the first vessel 31 (i.e., to-be-treated water that is subjected to the primary treatment) is introduced into an end of the second vessel 41. The end of the second vessel 41 has an opening so that the second brine left after treated by the second vessel 41 (i.e., to-be-treated water that is subjected to the secondary treatment) is discharged.

A predetermined operation pressure is loaded onto the opening at the introduction side of the first vessel 31 by a high-pressure pump 72 and a pressure raising pump 73 (see FIG. 1). Further, the first vessel 71 and the second vessel 41 may be configured by FRP (i.e., fiber reinforces plastics) etc., to resist a predetermined high pressure. Moreover, the first vessel 71 and the second vessel 41 are preferably connected via a pipe (e.g., flow passage 52) made of a high-pressure resistant material.

As shown in FIG. 5, the first vessel 31 is provided with an introduction pipe 32 configured to introduce the first to-be-treated water into the first vessel 31, and a first brine discharge pipe 33 configured to discharge the brine left not permeated into the water collecting pipe 25. The first permeate permeated through the reverse osmosis membrane 22 and collected in the water collecting pipe 25 is discharged, for example, from the first vessel 31 via a first discharge pipe 34 disposed at a side of a first brine discharge pipe 33. A measurement apparatus 35 is arranged at an outlet of the first discharge pipe 34.

The second vessel 41 is provided with an introduction pipe configured to introduce the first brine discharged from the first vessel 31 into the second vessel 41, and a second brine discharge pipe 43 configured to discharge the second brine left not permeated into the water collecting pipe 25. At an outlet of the second brine discharge pipe 43, a brine discharge valve 44 is arranged, which is configured to adjust a pressure inside the second vessel 41.

The second permeate permeated through the reverse osmosis membranes 22 and collected in the water collecting pipe 25 is discharged, for example, from the second vessel 41 via a second discharge pipe 45 arranged at a side of the second brine discharge pipe 43. A measurement apparatus 46 is arranged at an outlet of the second discharge pipe 45.

In the above described reverse osmosis treatment device 11, the first to-be-treated water sequentially permeates through the reverse osmosis membranes 22, and is collected in the water collecting pipe 25. In Example 1, the reverse osmosis treatment is carried out via two stages, that is, at the first vessel 31 and the second vessel 41. The first permeate treated in the first vessel 31 is fed to the second vessel 41 via the flow passage 52, introduced into the element 21, sequentially permeated through the reverse osmosis membranes 22, and collected in the water collecting pipe 25. The second permeate thus treated in the second vessel 41 is discharged through the discharge pipe 45 into the flow passage 60. The second brine left not permeated in the water collecting pipe 25 is fed to the first energy recovery device 81.

Figure 6:
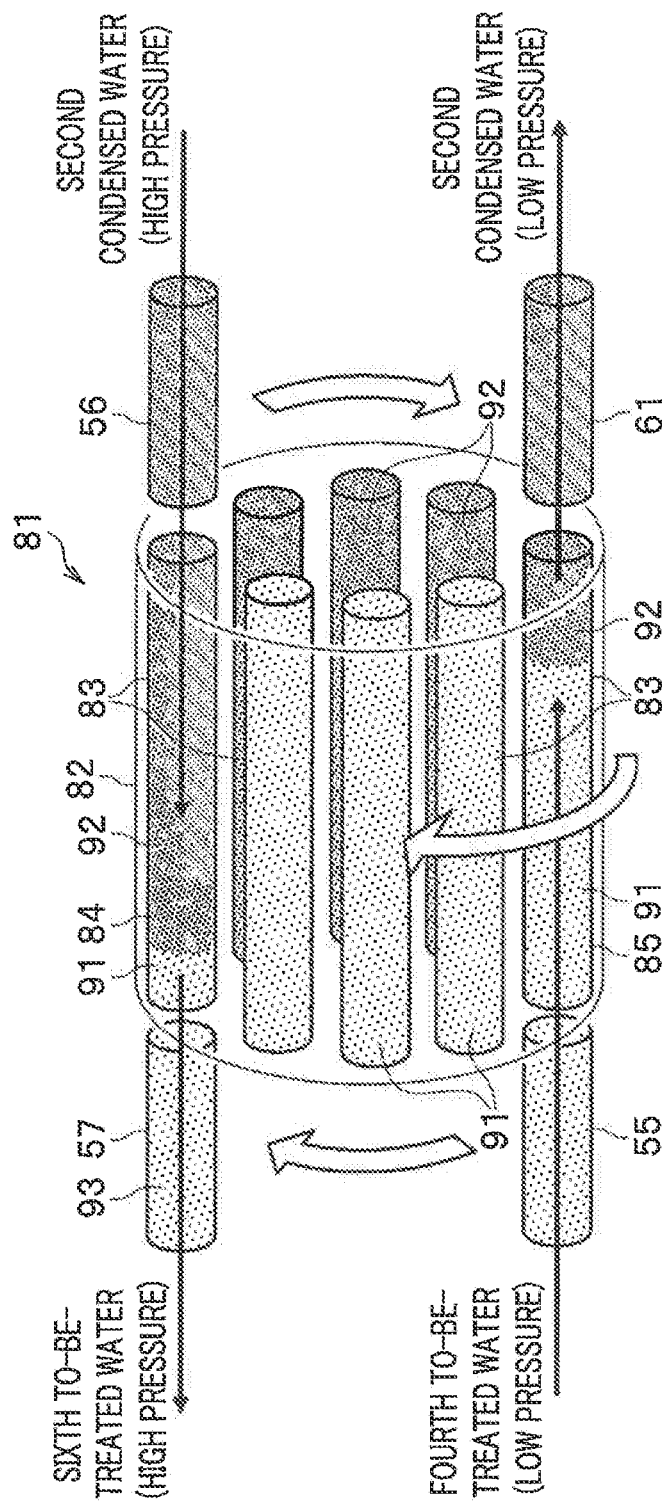
FIG. 6 is a perspective diagram showing a configuration of a first energy recovery device of the reverse osmosis treatment system in Example 1 of the present invention.

FIG. 6 is a perspective diagram showing a configuration of the first energy recovery device 81. The first energy recovery device 81 is a displacement type of energy recovery device. The first energy recovery device 81 is provided with a cylindrical rotor 82 of which rotation axis points in a substantially horizontal direction. A plurality of pressure exchange units 83 are arranged at equal interval on an inner periphery of the rotor 82. The pressure exchange unit 83 is a cylindrical vessel of which axis points in a substantially horizontal direction.

Each pressure exchange unit 83 changes a position thereof associated with rotation of the rotor 82. Further, when a pressure exchange unit 83 is located at the uppermost position 84 of the rotor 82, one end of the pressure exchange unit 83 is connected to a flow passage (i.e., pipe) 56, while the other end is connected to a flow passage (i.e., pipe) 57. In contrast, when a pressure exchange unit 83 is located at a position different from the uppermost position 84 of the rotor 82, for example, at the lowermost position 85, one end of the pressure exchange unit 83 is connected to a flow passage (i.e., pipe) 61, while the other end is connected to a flow passage (i.e., pipe) 55.

The pressure exchange unit 83 is filled with the fourth pressured water (i.e., reference number 91) or the second brine (i.e., reference number 92). When a pressure exchange unit 83 is located at a position different from the uppermost position 84 and the lowermost position 85, the pressure exchange unit 83 hermetically stores the fourth pressured water 91 or the second brine 92 in the state of keeping the fourth pressured water 91 or the second condensed 92 filled therein and the pressures thereof.

Next, the effects of the reverse osmosis treatment system 1 having the above described configuration will be described in detail. To-be-treated water subjected by the reverse osmosis treatment system 1 (i.e., eventually, the first to-be-treated water) is highly pressured by the high-pressure pump 72 and the pressure raising pump 73 and fed to the reverse osmosis treatment device 11. The pressure of the first to-be-treated water is kept high by adjusting an opening of a brine discharge valve 44 (see FIG. 5). Here, when the pressure of the first to-be-treated water is higher than the osmosis pressure of said first to-be-treated water (i.e., brine), the first permeate and the second permeate are obtained in the reverse osmosis treatment device 11 via reverse osmosis. Herein, a pressure of the first permeate is kept high by appropriately adjusting an opening of a flow rate control valve 76 or performance of the second energy recovery device 75.

In the above configuration, each of the first permeate and the second brine discharged from the reverse osmosis treatment device 11 has a high pressure. Hereby, pressure energy of the first permeate and the second brine can be recovered by the first energy recovery device 81 and the second energy recovery device 75. Then, eventually the recovered pressure energy can be used for pressuring the first to-be-treated water, up to a high degree.

As mentioned above, recovery of the pressure energy of the first permeate and the second brine and recycle of the resulting energy in the reverse osmosis treatment system 1 enable output of the high-pressure pump 72 and the pressure raising pump 73 to be made smaller. Accordingly, this results in accomplishment of the energy saving in the entire reverse osmosis treatment system 1.

Figure 7:
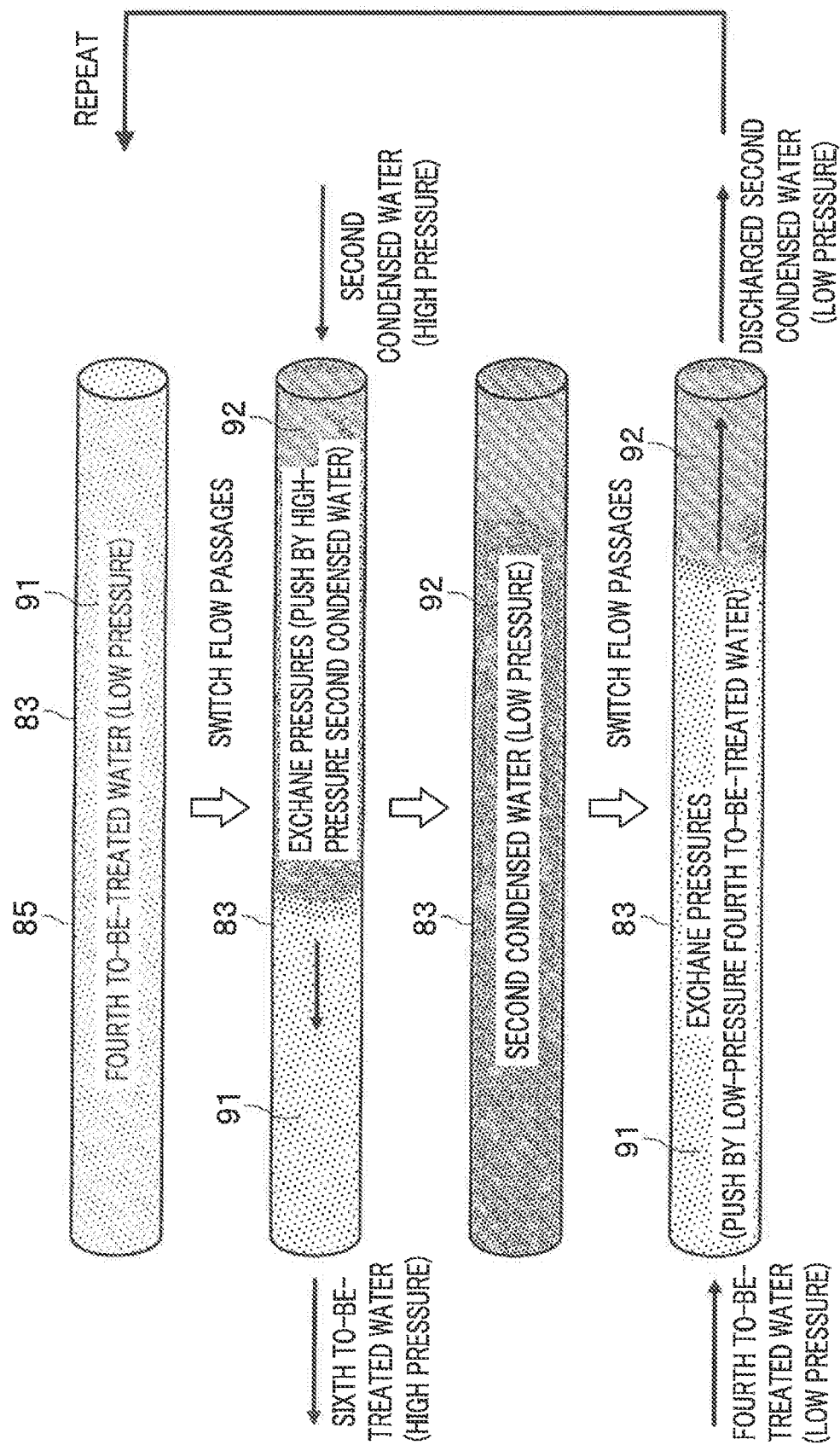
FIG. 7 is an explanatory diagram showing a function of the first energy recovery device of the reverse osmosis treatment system in Example 1 of the present invention.

Next, effects of the first energy recovery device 81 will be described in detail. FIG. 7 is an explanatory diagram showing the effects of the first energy recovery device 81. First, assume that when a pressure exchange unit 83 is located at the lowermost position 85 (see FIG. 6), the low-pressure fourth to-be-treated water 91 is injected from the flow passage 55, and the subjected pressure exchange unit 83 thus mentioned above holds the fourth to-be-treated water 91 as well as the pressure thereof (i.e., the subjected pressure exchange unit 83 drawn at the highest position in FIG. 7).

Then, the rotor 82 rotates and the subjected pressure exchange unit 83 moves to the uppermost position 84 (see FIG. 6). At that time, switching of flow passages occurs so that the flow passages connected to the subjected pressure exchange unit 83 are switched to the flow passages 56 and 57. Hereby, the high-pressure second brine flows into the subjected pressure exchange unit 83 through the flow passage 56, thereby to push the fourth to-be-treated water 91 held in the subjected pressure exchange unit 83 into the flow passage 57 (i.e., see the subjected pressure exchange unit 83 drawn at the secondly higher position in FIG. 7).

The high-pressure second brine pushes the low-pressure fourth to-be-treated water 91. This pushing movement causes pressure exchange therebetween to make the pressure of the fourth to-be-treated water high. The resulting high-pressure fourth to-be-treated water is pushed out to the flow passage 57 as converted to the sixth to-be-treated water 93 (see FIG. 6).

As a result, the subjected pressure exchange unit 83 comes to the state filled with the low-pressure second brine thus subjected to the pressure exchange (i.e., the pressure exchange unit 83 drawn at the thirdly higher position in FIG. 7). Then, the rotor 82 rotates and the subjected pressure exchange unit 83 moves to the lowermost position 85 (see FIG. 6).

At that time, switching of flow passages occurs so that the flow passages connected to the subjected pressure exchange unit 83 are switched to the flow passages 61 and 55 (see FIG. 6). Hereby, the low-pressure fourth to-be-treated water 91 flows into the subjected pressure exchange unit 83 through the flow passage 55, thereby to push the second brine 92 held in the subjected pressure exchange unit 83 into the flow passage 61 (i.e., see the subjected pressure exchange unit 83 drawn at the lowermost position in FIG. 7). The resulting low-pressure second brine 92 is pushed out to the flow passage 61 (see FIG. 6).

Accordingly, when the series of processes thus explained referencing to FIGS. 6 and 7 are repeated, pressure exchange is repeatedly conducted between the high-pressure second brine and the low-pressure fourth to-be-treated water. Then, the low-pressure fourth to-be-treated water is eventually converted to the high-pressure sixth to-be-treated water and fed to the pressure raising pump 73.

Here, the second energy recovery device (i.e., pressure raising device) 75 is configured to raise a pressure of the to-be-treated water (i.e., third to-be-treated water) located at a downstream side of the branched portion 71 with a pressure of the first permeate thus separated in the reverse osmosis treatment device 11. Therefore, the second energy recovery device 75 is disposed at a downstream side of the branched portion 71 in the flow passage 54.

This configuration more efficiently enhances the energy recovery efficiency than a configuration in which the second energy recovery device 75 is disposed at an upstream side of the branched portion 71 in the flow passage 53.

Here, the above advantageous effect will be described more specifically hereinafter. A raised pressure degree of the third to-be-treated water performed by the second energy recovery device 75 is represented in the following Equation (1).

$$P_p = \eta_{ERT} \times (P_{Tin} - P_{Tout}) \times Q_T \times Q_p^{-1} \times 100^{-1} \text{—} \qquad \text{Equation (1)}$$

where $P_p$: a raised pressure degree of the third to-be-treated water (Mpa); $\eta_{ERT}$: energy conversion efficiency of the second energy recovery device 75 (%); $P_{Tin}$: a pressure at inlet located at the turbine or Pelton wheel side of the second energy recovery device 75 (Mpa); $P_{Tout}$: a pressure at outlet located at the turbine or Pelton wheel side of the second energy recovery device 75 (Mpa); $Q_T$: a flow rate (i.e., of the first permeate) at the turbine or Pelton wheel side of the second energy recovery device 75 (m³/h); $Q_p$: a flow rate of the third to-be-treated water (m³/h).

According to Equation (1), it is elucidated that the less the flow rate of the third to-be-treated water becomes, the more the raised pressure degree of the third to-be-treated water becomes. Thus, the arrangement of the branched portion 71, at which the third to-be-treated water is divided from the fourth to-be-treated water subjected to the pressure exchange in the first energy recovery device 81, at an upstream side of the second energy recovery device 75 allows the flow rate of the third to-be-treated water to be decreased, leading to enhancement of the raised pressure degree of the third to-be-treated water. As a result, it is possible to raise the pressure of the third to-be-treated water, thereby to efficiently convert the third to-be-treated water to the fifth to-be-treated water.

Alternatively, assume that the second energy recovery device 75 is arranged at an upstream side of the branched portion 71, the fourth to-be-treated water may be also pressured by the energy recovered in the second energy recovery device 75.

As described above referring to FIG. 7, the fourth to-be-treated water 91, which flows into the pressure exchange unit 83 to push out the second brine, has a low pressure. After, this pressure exchange, the second brine 91 falls in a low pressure state.

However, assume that the second energy recovery device 75 is arranged at an upstream side of the branched portion 71 in the flow passage 53. In this case, even though a pressure of the fourth to-be-treated water is low, a pressure of the fourth to-be-treated water flowing into the pressure exchange unit 83 is higher than a pressure of fourth to-be-treated water in the case where the second energy recovery device 75 is disposed at a downstream side of the branched portion 71 in the flow passage 54 (i.e., Example 1 of the present invention).

Hereby, as shown by the pressure exchange unit 83 drawn in the lowest position in FIG. 7, a pressure of the second brine 92 subjected to the pressure exchange with the fourth to-be-treated water 91 that pushes said second brine 92 dose not sufficiently fall to low. Under this condition, the second brine 92 is discharged through the flow passage 61 to the outside of the system. Namely, this means that a part of the energy recovered by the second energy recovery device 75 is discharged to the outside of the system together with the second brine 92. In other word, even though the pressure energy of the first permeate is recovered, it does not mean that the recovered pressure energy is not effectively utilized.

On the contrary, in the present Example 1, the second energy recovery device 75 is disposed at a downstream side of the branched portion in the flow passage 54. This configuration enables the pressure energy recovered by the second energy recovery device 75 to be totally utilized for raising the pressure of the third to-be-treated water. The resulting third to-be-treated water totally flows into the reverse osmosis treatment device 11 as the first to-be-treated water, while this third to-be-treated water does not flow into the first energy recovery device 81. Thus, the energy recovered by the second energy recovery device 75 can be efficiently utilized.

As mentioned above, according to Example 1, it is possible to provide the reverse osmosis treatment system 1 that simultaneously and efficiently recovers energy both at second brine and first permeate sides.

Further, in the present Example 1, the second energy recovery device 75 is configured to increase a pressure of the third to-be-treated water before fed by the high-pressure pump 72. That is, the second energy recovery device 75 is disposed at an upstream side of the high-pressure pump 72 instead of a downstream side thereof.

As mentioned above, when the second energy recovery device 75 is disposed at an upstream side of the high-pressure pump 72, the second energy recovery device 75 is not required to be made in a specification of high-pressure resistance. Thus, it is possible to reduce the production costs of the second energy recovery device 75, when compared to the configuration in which the second energy recovery device 75 is disposed at a downstream side of the high-pressure pump 72.

Example 2

Figure 8:
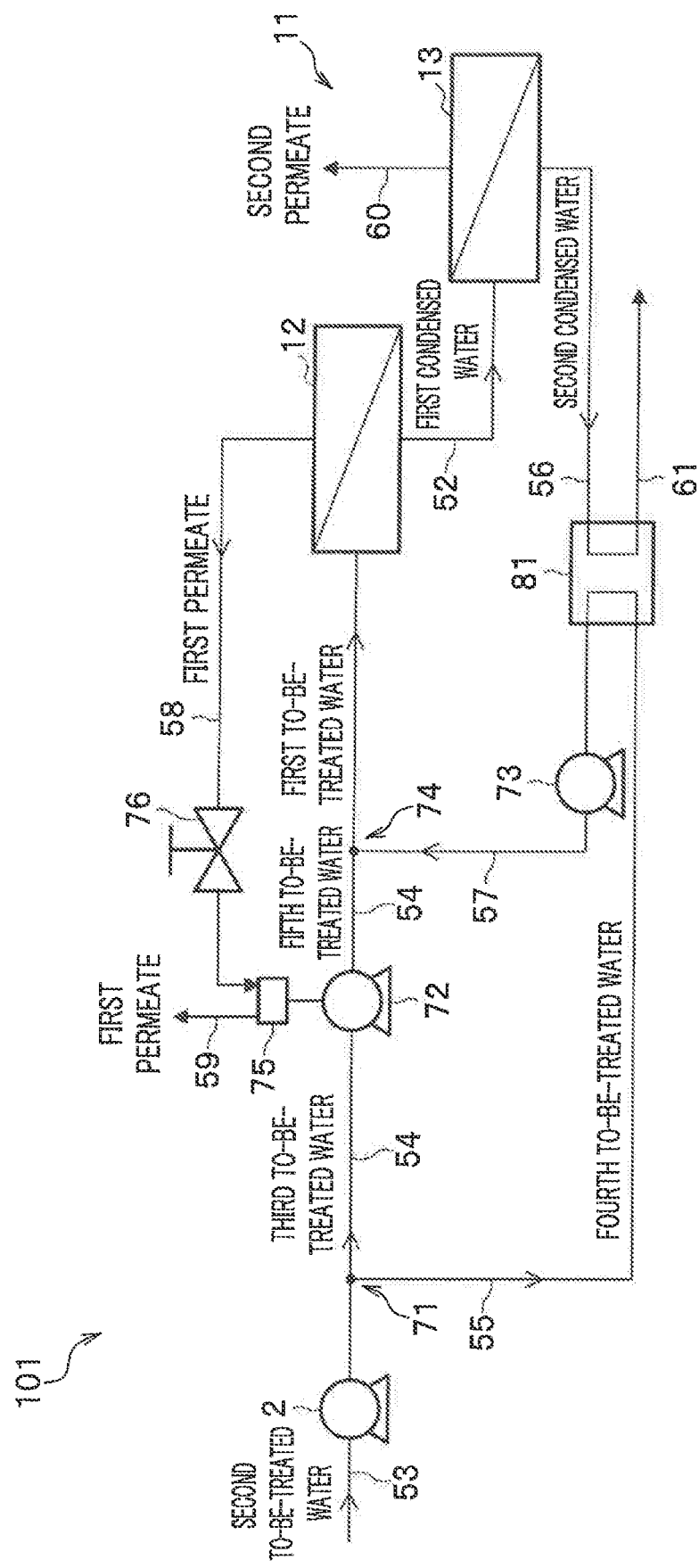
FIG. 8 is an explanatory diagram showing an overall configuration of a reverse osmosis treatment system in Example 2 of the present invention.

FIG. 8 is an explanatory diagram showing the entire configuration of a reverse osmosis treatment system 101 of Example 2. In FIG. 8, components having the same reference numbers and names as in Example 1 are the same as in Example 1. Thus, the detailed descriptions thereof will be omitted.

A configuration of Example 2 shown in FIG. 8 differs from that of Example 1 such that a second energy recovery device 75 working as a pressure raising device is not disposed, instead, a high-pressure pump (i.e., first pump) 72 is provided with an auxiliary device working as a pressure raising device 75, and the auxiliary device 75 is driven by energy of first permeate.

Figure 9:
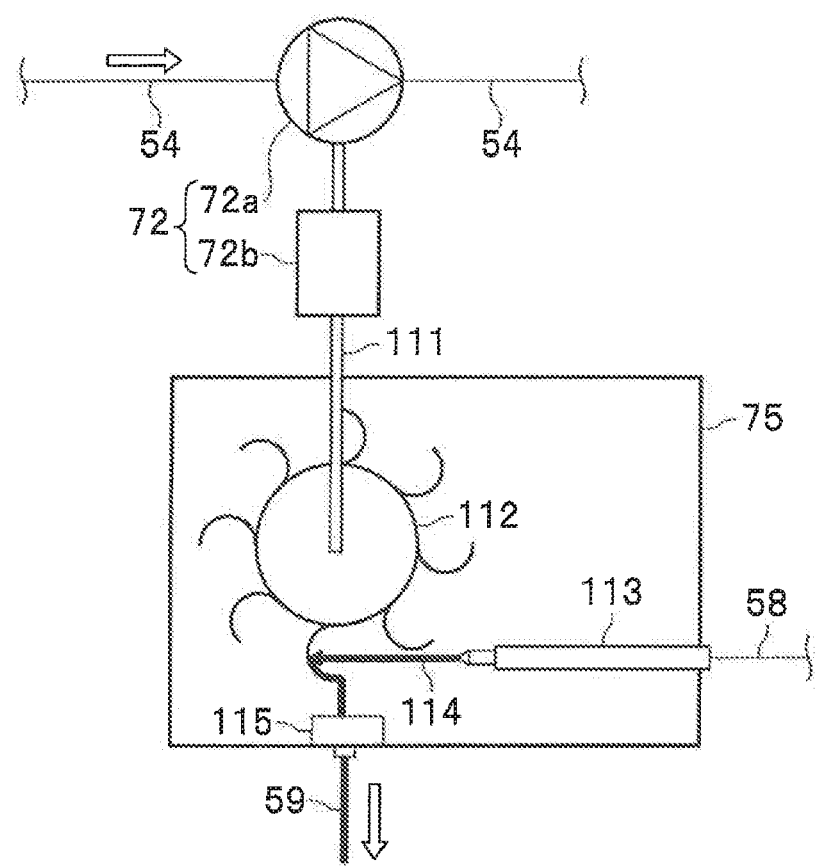
FIG. 9 is an explanatory diagram showing a detailed configuration of the reverse osmosis treatment system in Example 2 of the present invention.

FIG. 9 is an explanatory diagram showing a detailed configuration of the high-pressure pump 72 and the auxiliary device 75. The high-pressure pump 72 includes a rotor 72a of which rotation raises a pressure of third to-be-treated water in a flow passage 54, and a motor 72b which rotates the rotor 72a.

The auxiliary device 75 has a Pelton wheel 112 (or a typical turbine) fixed to a motor axis 111 of the motor 72b. A pressure of permeate (i.e., first permeate) rotate the Pelton wheel 112 (or a turbine). More specifically, the auxiliary device 75 includes a nozzle 113 configured to spray high-pressure first permeate 114 to the Pelton wheel 112 (or turbine), and a discharge unit 115 configured to drain the first permeate 114 thus dropped from the Pelton wheel 112 (or turbine) into a flow passage 59.

In Example 2, the Pelton wheel 112 (or turbine) is rotated by energy of the first permeate 114, resulting in assistance of the rotation of the motor 72b. Hereby, this enables the electric power driving the motor 72 to be reduced, thereby realizing conservation of electric power.

Further, series arrangement of the high-pressure pump 72 and the auxiliary device 75 in the flow passage 54 as in Example 1 is not needed. Thus, this arrangement enables a length of the flow passage 54 to b e shorter and the structure of the reverse osmosis treatment system 101 to be more compact.

Moreover, similarly to Example 1, in Example 2, it is possible to provide a reverse osmosis treatment system 1 capable of simultaneously and efficiently recovering energy of both second brine and first permeate sides.

Example 3

Figure 10:
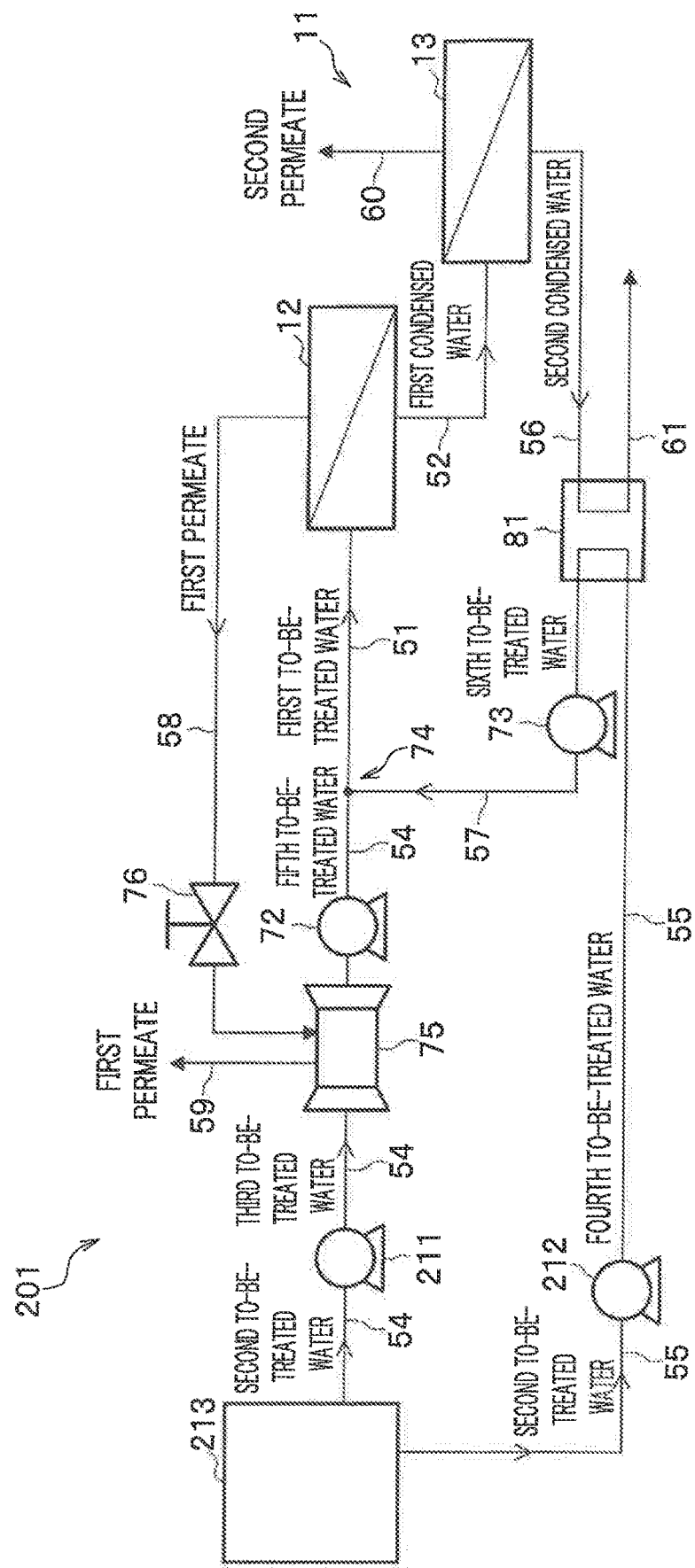
FIG. 10 is an explanatory diagram showing an overall configuration of a reverse osmosis treatment system in Example 3 of the present invention.

FIG. 10 is an explanatory diagram showing the entire configuration of a reverse osmosis treatment system 201 of Example 3. In FIG. 10, components having the same reference numbers and names as in Example 1 are the same as in Example 1. Thus, the detailed descriptions thereof will be omitted.

The reverse osmosis treatment system 201 of Example 3 includes a reverse osmosis treatment device 11 configured to separate first to-be-treated water into permeate and brine via reverse osmosis similarly to Example 1.

Further, the reverse osmosis treatment device 201 includes a water feeding pump (i.e., first pump) 211 and a water feeding pump (i.e., second pump) 212.

The water feeding pump 211 (i.e., first pump) is configured to push out a part of second to-be-treated water stored in a raw water tank 213 through the flow passage 54 thereby to feed third to-be-treated water. The water feeding pump 212 (i.e., second pump) is configured to push out a remaining part of the second to-be-treated water through the flow passage 55 thereby to feed the fourth to-be-treated water.

The high-pressure pump (i.e., third pump) 72 is configured to pressurize the third to-be-treated water, thereby to feed the fifth to-be-treated water having a higher pressure than the third to-be-treated water into the flow passage 54. The first energy recovery device 81 introduces the brine (i.e., second brine) thus separated in the reverse osmosis treatment device 11 through the flow passage 56, and performs pressure exchange, thereby to produce the sixth to-be-treated water having a higher pressure than the fourth to-be-treated water.

At the merging portion 74 of the flow passages 54 and 57, the fifth to-be-treated water and the sixth to-be-treated water are merged, which produces the first to-be-treated water. The pressure raising device (i.e., second energy recovery device) 75 is configured to raise a pressure of the third to-be-treated water by rotating a turbine or a Pelton wheel using a pressure of the permeate (i.e., first permeate) fed through the flow passage 58 thus separated in the reverse osmosis treatment device 11. Since other components and structure of Example 3 are the same as in Example 1, the detailed explanations will be omitted.

In Example 3, an optimal pressure of the fourth to-be-treated water to be fed to the first energy recovery device 81 is set by the water feeding pump 212. Further, an optimal pressure of the third to-be-treated water to be fed to the second energy recovery device 75 is set by the water feeding pump 211.

Further, in Example 3 similarly to Example 1, it is also possible to provide a reverse osmosis treatment system 1 capable of simultaneously and efficiently recovering energy of both second brine and first permeate sides.

Here, it should be noted that the present invention is not limited to the above described Examples, and includes a variety of modifications. For example, the above Examples are described in detail only for explaining the present invention to be easily understood. Therefore, the present invention is not necessarily limited to the configurations having all of the components explained above.

Herein, it is possible to replace a part of the components of an Example with those of a different Example, or add a part of components of an Example to those of a different Example. Further, it is possible to add a component to, delete a component from, or replace a component with a part of components of each Example.

For example, in the respective Examples, the two modules consisting of the first module 12 and the second module 13 are used in the reverse osmosis treatment device 11. However, three or more modules may be used therein. Further, depending on the types of the second energy recovery device 75, the flow rate adjustment valve 76 may be disposed at a downstream side of the second energy recovery device 75, or may be omitted.

EXPLANATION OF REFERENCE NUMBERS

1 Reverse Osmosis Treatment System
11 Reverse Osmosis Treatment Device
71 Branched Portion
74 Merging Portion 74
72 High-Pressure Pump (i.e., First Pump, Third Pump)
72a Rotor
72b Motor
75 Pressure Raising Device (i.e., Second Energy Recovery Device)
81 First Energy Recovery Device
101 Reverse Osmosis Treatment System
111 Axis of Motor
112 Pelton Wheel
202 Reverse Osmosis Treatment System
211 Water Feeding Pump (i.e., First Pump)
212 Water Feeding Pump (i.e., Second Pump)

What is claimed is:

1. A reverse osmosis treatment system comprising:
a reverse osmosis treatment device configured to separate first to-be-treated water into permeate and brine via reverse osmosis;
a first pump configured to pressurize a part of second to-be-treated water thereby to feed pressurized third to-be-treated water to a second energy recovery device;
a second pump configured to pressurize a remaining part of the second to-be-treated water thereby to feed pressurized fourth to-be-treated water to a first energy recovery device;
a third pump configured to pressurize the third to-be-treated water thereby to feed pressurized fifth to-be-treated water having a higher pressure than the third to-be-treated water to a flow passage;
the first energy recovery device configured to exchange pressures between the fourth to-be-treated water and the brine thus separated by the reverse osmosis treatment device, thereby to produce sixth to-be-treated water having a higher pressure than the fourth to-be-treated water;
a merging portion configured to merge the fifth to-be-treated water from the flow passage and the sixth to-be-treated water, thereby to produce the first to-be-treated water; and
the second energy recovery device configured to pressurize the third to-be-treated water with a pressure of the permeate thus separated by the reverse osmosis treatment device.

2. The reverse osmosis treatment system according to claim 1, wherein the second energy recovery device is a turbine or a Pelton wheel.

* * * * *